United States Patent
Gomila et al.

(10) Patent No.: US 8,472,526 B2
(45) Date of Patent: *Jun. 25, 2013

(54) LOW-COMPLEXITY FILM GRAIN SIMULATION TECHNIQUE

(75) Inventors: Cristina Gomila, Princeton, NJ (US); Joan Llach, Princeton, NJ (US); Jeffrey Allen Cooper, Rocky Hill, NJ (US)

(73) Assignee: Thomson Licensing, Boulogne-Billancourt (FR)

( * ) Notice: Subject to any disclaimer, the term of this patent is extended or adjusted under 35 U.S.C. 154(b) by 1637 days.

This patent is subject to a terminal disclaimer.

(21) Appl. No.: 11/667,846

(22) PCT Filed: Sep. 26, 2005

(86) PCT No.: PCT/US2005/034723
§ 371 (c)(1),
(2), (4) Date: May 16, 2007

(87) PCT Pub. No.: WO2006/057703
PCT Pub. Date: Jun. 1, 2006

(65) Prior Publication Data
US 2008/0152250 A1    Jun. 26, 2008

Related U.S. Application Data

(60) Provisional application No. 60/630,640, filed on Nov. 23, 2004.

(51) Int. Cl.
*H04N 11/02* (2006.01)

(52) U.S. Cl.
USPC ............ 375/240.18; 375/240.16; 375/240.23; 341/59; 341/65; 341/67; 348/700

(58) Field of Classification Search
USPC ............ 375/240.26–240.29, E7.037, E7.054, 375/E7.056, E7.142, E7.177, E7.191; 348/700
See application file for complete search history.

(56) References Cited

U.S. PATENT DOCUMENTS

| 4,935,816 A | 6/1990 | Faber |
| 5,140,414 A | 8/1992 | Mowry |

(Continued)

FOREIGN PATENT DOCUMENTS

| EP | 0364285 | 4/1990 |
| EP | 0622000 | 10/1992 |

(Continued)

OTHER PUBLICATIONS

Oktem, Transform Domain Algorithm for Reducing Effect of Film-Grain Noise in Image compression, Oct 14, 1999, vol. 35, No. 21.*

(Continued)

*Primary Examiner* — Taghi Arani
*Assistant Examiner* — Josnel Jeudy
(74) *Attorney, Agent, or Firm* — Robert D. Shedd; Robert B. Levy

(57) ABSTRACT

The simulation of film grain in a video image occurs by first creating a block (i.e., a matrix array) of transformed coefficients for a set of cut frequencies $f_{HL}$, $f_{VL}$, $f_{HH}$ and $f_{VH}$ associated with a desired grain pattern. (The cut frequencies $f_{HL}$, $f_{VL}$, $f_{HH}$ and $f_{VH}$ represent cut-off frequencies, in two dimensions, of a filter that characterizes the desired film grain pattern). The block of transformed coefficients undergoes an inverse transform to yield a bit-accurate film grain sample and the bit accurate sample undergoes scaling to enable blending with a video signal to simulate film grain in the signal.

16 Claims, 3 Drawing Sheets

U.S. PATENT DOCUMENTS

| | | | |
|---|---|---|---|
| 5,285,402 A | 2/1994 | Keith | |
| 5,335,013 A | 8/1994 | Faber | |
| 5,374,954 A | 12/1994 | Mowry | |
| 5,406,326 A | 4/1995 | Mowry | |
| 5,457,491 A | 10/1995 | Mowry | |
| 5,471,572 A | 11/1995 | Buchner et al. | |
| 5,475,425 A | 12/1995 | Przyborski et al. | |
| 5,526,446 A | 6/1996 | Adelson et al. | |
| 5,550,815 A | 8/1996 | Cloonan et al. | |
| 5,629,769 A | 5/1997 | Cookingham et al. | |
| 5,641,596 A | 6/1997 | Gray et al. | |
| 5,659,382 A | 8/1997 | Rybczynski | |
| 5,687,011 A | 11/1997 | Mowry | |
| 5,709,972 A | 1/1998 | Cookingham et al. | |
| 5,742,892 A | 4/1998 | Chaddha | |
| 5,767,860 A | 6/1998 | Zimmer et al. | |
| 5,831,673 A | 11/1998 | Przyborski et al. | |
| 5,887,075 A | 3/1999 | Kruppa | |
| 5,917,609 A | 6/1999 | Breeuwer et al. | |
| 6,067,125 A | 5/2000 | May | |
| 6,134,200 A | 10/2000 | Timmermans | |
| 6,216,838 B1 | 4/2001 | Bacher et al. | |
| 6,219,838 B1 | 4/2001 | Cherichetti et al. | |
| 6,233,647 B1 | 5/2001 | Bentz et al. | |
| 6,269,180 B1 | 7/2001 | Sevigny | |
| 6,285,711 B1 | 9/2001 | Ratakonda et al. | |
| 6,327,304 B1 | 12/2001 | Miller et al. | |
| 6,327,391 B1 | 12/2001 | Ohnishi et al. | |
| 6,373,992 B1 | 4/2002 | Nagao | |
| 6,441,918 B1 | 8/2002 | Hori | |
| 6,496,221 B1 | 12/2002 | Wolf et al. | |
| 6,559,849 B1 | 5/2003 | Anderson et al. | |
| 6,587,509 B1 | 7/2003 | Suzuki et al. | |
| 6,636,645 B1 * | 10/2003 | Yu et al. | 382/268 |
| 6,650,327 B1 | 11/2003 | Airey et al. | |
| 6,665,369 B2 | 12/2003 | Ukita | |
| 6,667,815 B1 | 12/2003 | Nagao | |
| 6,724,942 B1 | 4/2004 | Arai | |
| 6,728,317 B1 * | 4/2004 | Demos | 375/240.21 |
| 6,744,928 B1 | 6/2004 | Juri et al. | |
| 6,839,152 B2 | 1/2005 | Fan et al. | |
| 6,868,190 B1 | 3/2005 | Morton | |
| 6,990,251 B2 | 1/2006 | Edgar | |
| 6,990,252 B2 | 1/2006 | Shekter | |
| 7,065,255 B2 | 6/2006 | Chen et al. | |
| 7,092,016 B2 | 8/2006 | Morton et al. | |
| 7,245,783 B2 | 7/2007 | Fielding | |
| 7,362,911 B1 | 4/2008 | Frank | |
| 7,596,239 B2 | 9/2009 | Winger et al. | |
| 7,630,005 B2 | 12/2009 | Takei | |
| 7,664,337 B2 | 2/2010 | Balram et al. | |
| 7,856,055 B2 * | 12/2010 | Zhou et al. | 375/240.12 |
| 7,958,532 B2 | 6/2011 | Paul et al. | |
| 2001/0056568 A1 | 12/2001 | Hirotsu et al. | |
| 2002/0016103 A1 | 2/2002 | Behnke | |
| 2002/0034337 A1 | 3/2002 | Shekter | |
| 2002/0171649 A1 | 11/2002 | Fogg | |
| 2003/0011615 A1 | 1/2003 | Tidwell | |
| 2003/0043922 A1 | 3/2003 | Kalker et al. | |
| 2003/0068097 A1 | 4/2003 | Wilson et al. | |
| 2003/0086623 A1 | 5/2003 | Berkner et al. | |
| 2003/0206231 A1 | 11/2003 | Chen et al. | |
| 2003/0206662 A1 | 11/2003 | Avinash et al. | |
| 2004/0013308 A1 | 1/2004 | Jeon et al. | |
| 2006/0082649 A1 | 4/2006 | Gomila et al. | |
| 2006/0083316 A1 | 4/2006 | Cooper et al. | |
| 2006/0083426 A1 | 4/2006 | Cooper et al. | |
| 2006/0133686 A1 | 6/2006 | Gomila et al. | |
| 2006/0182183 A1 | 8/2006 | Winger | |
| 2006/0256853 A1 | 11/2006 | Schlockermann et al. | |
| 2007/0036452 A1 | 2/2007 | Llach et al. | |
| 2007/0047658 A1 | 3/2007 | Tourapis et al. | |
| 2007/0058866 A1 | 3/2007 | Boyce et al. | |
| 2007/0058878 A1 | 3/2007 | Gomilla et al. | |
| 2007/0070241 A1 | 3/2007 | Boyce et al. | |
| 2007/0104380 A1 | 5/2007 | Gomila et al. | |
| 2007/0117291 A1 | 5/2007 | Cooper et al. | |
| 2007/0297515 A1 | 12/2007 | Gomila et al. | |
| 2008/0252781 A1 | 10/2008 | Dewaele et al. | |

FOREIGN PATENT DOCUMENTS

| | | |
|---|---|---|
| EP | 1175091 | 1/2002 |
| EP | 1215624 | 6/2002 |
| EP | 1511320 | 3/2005 |
| EP | 1815688 | 8/2007 |
| GB | 2312124 | 10/1997 |
| JP | 4097681 | 3/1992 |
| JP | 8079765 | 3/1996 |
| JP | 08-149466 | 6/1996 |
| JP | 10-509297 | 9/1998 |
| JP | 2002/359845 | 12/2002 |
| JP | 2003-24326 | 1/2003 |
| JP | 2005/080301 | 9/2003 |
| JP | 2007/521573 | 9/2003 |
| JP | 2007/529945 | 3/2004 |
| JP | 2007/507172 | 3/2007 |
| WO | WO9314591 | 7/1993 |
| WO | WO9520292 | 7/1995 |
| WO | WO 97/10676 | 3/1997 |
| WO | WO9722204 | 6/1997 |
| WO | WO 00/18109 | 3/2000 |
| WO | WO0146992 | 6/2001 |
| WO | WO0177871 | 10/2001 |
| WO | WO 02/33958 | 4/2002 |
| WO | WO 02/51160 | 6/2002 |
| WO | WO 03/005731 | 1/2003 |
| WO | WO2004095829 | 11/2004 |
| WO | WO2004104931 | 12/2004 |
| WO | WO2005027045 | 3/2005 |
| WO | WO2005032143 | 4/2005 |
| WO | WO2005034518 | 4/2005 |
| WO | WO 2006/055208 | 5/2006 |
| WO | WO 2006/057703 A1 | 6/2006 |

OTHER PUBLICATIONS

Jun Xin, et al, Converting DCT Coefficient to H.264/AVC, Jun. 2004, Mitsubishi Electrical Research Laboratories, Inc.*

Alexis M. Tourapis et al., "Quantization Offset Matrices for Fidelity Range Extensions", grai Joint Video Team (JVT) of ISO/IEC MPEG & ITU-T VCEG (ISO/IEC JTC1/SC29/WG11 and ITU-T SG16 Q.6) 12th Meeting: Redmond, Washington USA, Jul. 19-23, 2004 (Document JVT-L032).

Al-Shaykh et al, "Lossy Compression of Images Corrupted by Film Grain Noise," School of Electrical and Computer Engineering, 1996 IEEE.

Al-Shaykh et al, "Restoration of Lossy Compressed Noisy Images," IEEE Transactions on Image Processing, vol. 8, No. 10, Oct. 1999.

Al-Shaykh, "Lossy Compression of Noisy Images," IEEE Transactions on Image Processing, vol. 7, No. 12, Dec. 1998.

Brightwell et al, "Automated Correction of Film Unsteadiness, Dirt and Grain," International Broadcasting Convention, Sep. 16-20, 1994, Conference Publication No. 397, IEE, 1994.

Campisi et al, "Signal-Dependent Film Grain Noise Generation Using Homomorphic Adaptive Filtering," IEE Proceedings, Image Signal Process, vol. 147, No. 3, Jun. 2000.

Chao et al, "Constant Quality Rate Control for Streaming MPEG-4 Fgs. Video," Integrated Media Systems Center and Department of Electrical Engineering, University of Southern California, 2000 IEEE.

Chavel et al, "Film Grain Noise in Partially Coherent Imaging," Optical Engineering, vol. 19, No. 3, May-Jun. 1980.

Fischer et al, "Image Sharpening Using Permutation Weighted Medians," Department of Electrical Engineering, University of Delaware, fischer@ee.udel.edu, paredesj@ee.udel.edu; arce@ee.udel.edu., 2002.

Illingworth et al, "Vision, Image and Signal Processing," The Institution of Electrical Engineers, IEE Proceedings, Jun. 2000, vol. 147, No. 3.

McLean et al, "Telecine Noise Reduction," XP-002285972, 2001 The Institute of Electrical Engineers.

Oktem et al, "Transform Domain Algorithm for Reducing Effect of Film-Grain Noise in Image Compression," Electronics Letters, Oct. 14, 1999, vol. 35, No. 21.

Peng et al, "Adaptive Frequency Weighting for Fine-Granularity-Scalability," Philips ResearchUSA, Visual Communications and Image Processing 2002, Proceedings of SPIE, vol. 4671 (2002) SPIE0277-786X02.

Prades-Nebot et al, "Rate Control for Fully Fine-Grained Scalable Video Coders," Visual Communications and Image Processing 2002, Proceedings of SPIE, vol. 4671 (2002), SPIE 0277-786X/02.

Schaar et al, "Fine-Granularity-Scalability for Wireless Video and Scalable Storage," Visual Communications and Image Processing 2002, Proceedings of SPIE, vol. 4671 (2002) SPIE 0277-786X/02.

Shahnaz et al, "Image Compression in Signal-Dependent Noise," Applied Optics, vol. 38, No. 26, Sep. 10, 1999.

Yan et al, "Efficient Video Coding with Hybrid Spatial and Fine-Grain SNR Scalabilities," Department of Electronic Engineering, Beijing Institute of Technology, China, 2002.

Yan et al, "Film Grain Noise Removal and Generation for Color Images," Department Electrical and Computer Engineers, University of Toronto, dimitris@comm.toronto.edu, 1998.

Yan et al, "Signal-Dependent Film Grain Noise Removal and Generation Based on Higher-Order Statistics," University of Toronto, Department of Electrical and Computer Engineering, dimitris@comm.toronto.edu, 1997 IEEE.

Yoshida, "Go with the Grain, Film R&D Chief Urges, for Art's Sake," EE Times, Feb. 7, 2005.

Zhang et al, "Constant Quality Constrained Rate Allocation for FGS Video Coded Bitstreams," Visual Communications and Image Processing 2002, Proceedings of SPIE, vol. 4671 (2002) SPIE 0277-786X/02.

Bjontegaard, G: "Addition of Comfort Noise" as Post Processing, ITU Telecommunications Standardization Sector, Study Group 16, 2nd Meeting, Sunriver, Oregon Sep. 8-11, 1997.

Byun, H.I. et al; "Power Efficient MPEG-4 Decoder Architecture Featuring Low-Complexity Error Resilience", ASIC, 2002, Proceedings IEEE Asia Pacific Conference Aug. 6-8, 2002, Piscataway, New Jersey.

Conklin et al : Dithering 5-Tap Filter for Inloop Deblocking; JVT of ISO/IEC MPEG & ITU-T VCEG, $3^{rd}$ Meeting, Fairfax, VA, May 6-10, 2002, pp. 10-16.

Naderi, F. et al: "Estimation of Images Degraded by Film-Grain Noise", Applied Optics, nol. 17, Issue 8, pp. 1228-1237, Optical Society of America.

Pirsch, P. et al; "VLSI Architectures for Video Compression-A Survey", Proceeding of the IEEE. IEEE, New York, USA, vol. 83, No. 2, Feb. 1, 1995, pp. 220-246.

Puri, A. et al: "Video Coding Using the H.264/MPEG-4 AVC Compression Standard", Signal Processing Image Communication, Elsevier Science Publishers, Amsterdam, NL, vol. 19, No. 9, Oct. 1, 2004.

Sullivan,G. et al: "The H.264/AVC Advanced Video Coding Standard: Overview and Introduction to the Fidelity Range Extensions", Applications of Digital Image Processing XXVII, Proceedings of SPIE, vol. 5558, SPIE Bellingham, WA, 2004.

Takahashi, M. et al: "A 60-mW MPEG-4 Video Codec Using Clustered Voltage Scaling with Variable Supply-Voltage Scheme", IEEE Journal of Solid-State Circuits, IEEE Service Center, Piscataway, NJ, USA, vol. 33, No. 11, Nov. 1998. pp. 1772-1778.

Office Action from U.S. Appl. No. 10/552,179 mailed Sep. 12, 2010.
Office Action from U.S. Appl. No. 10/556,833 mailed May 10, 2010.
Final Office Action from U.S. Appl. No. 10/556,833 mailed Oct. 20, 2010.
Office Action from U.S. Appl. No. 10/556,833 mailed Jan. 7, 2011.
Office Action from U.S. Appl. No. 10/556,833 mailed Feb. 15, 2011.
Office Action from U.S. Appl. No. 10/556,833 mailed May 10, 2011.
Office Action from U.S. Appl. No. 10/556,833 mailed Sep. 30, 2011.
Final Office Action from U.S. Appl. No. 10/571,148 mailed May 12, 2010.
Office Action from U.S. Appl. No. 10/571,148 mailed Sep. 10, 2010.
Office Action from U.S. Appl. No. 10/572,820 mailed Mar. 19, 2010.
Office Action from U.S. Appl. No. 10/572,820 mailed May 11, 2010.
Final Office Action from U.S. Appl. No. 10/572,820 mailed Sep. 30, 2010.
Final Office Action from U.S. Appl. No. 10/575,676 mailed Mar. 4, 2010.
Office Action ADVACTION from U.S. Appl. No. 10/575,676 mailed Jun. 7, 2010.
Office Action from U.S. Appl. No. 10/575,676 mailed Jul. 19, 2011.
Final Office Action from U.S. Appl. No. 10/575,676 mailed Oct. 26, 2011.
Office Action from U.S. Appl. No. 11/246,848 mailed Jul. 6, 2010.
Final Office Action from U.S. Appl. No. 11/246,848 mailed Oct. 13, 2010.
Office Action from U.S. Appl. No. 11/268,070 mailed Jul. 21, 2010.
Final Office Action from U.S. Appl. No. 11/268,070 mailed Nov. 12, 2010.
Office Action ADVACTION from U.S. Appl. No. 11/268,070 mailed Jan. 11, 2011.
Office Action from U.S. Appl. No. 11/268,070 mailed Jun. 22, 2011.
Final Office Action from U.S. Appl. No. 11/273,067 mailed Aug. 4, 2010.
Office Action from U.S. Appl. No. 11/284,378 mailed Aug. 31, 2010.
Office Action from U.S. Appl. No. 11/284,373 mailed Dec. 22, 2010.
Office Action from U.S. Appl. No. 11/667,581 mailed Jun. 8, 2011.
Final Office Action from U.S. Appl. No. 11/667,581 mailed Oct. 14, 2011.
Office Action from U.S. Appl. No. 11/667,629 mailed Jul. 9, 2010.
Final Office Action from U.S. Appl. No. 11/667,629 mailed Nov. 19, 2010.
Office Action from U.S. Appl. No. 11/667,629 mailed Jan. 13, 2011.
Final Office Action from U.S. Appl. No. 11/667,629 mailed Apr. 22, 2011.
Office Action from U.S. Appl. No. 11/667,816 mailed Sep. 15, 2011.
Final Office Action from U.S. Appl. No. 11/667,816 mailed Dec. 5, 2011.
Office Action from U.S. Appl. No. 12/589,217 mailed Jul. 13, 2010.
Final Office Action from U.S. Appl. No. 12/589,217 mailed Oct. 28, 2010.
Office Action from U.S. Appl. No. 12/589,217 mailed Dec. 2, 2010.
Office Action from U.S. Appl. No. 10/556,834 mailed Aug. 19, 2008.
Office Action from U.S. Appl. No. 10/556,834 mailed Feb. 20, 2009.
Notice of Non-Compliant Amendment from U.S. Appl. No. 10/556,834 mailed Jun. 16, 2009.
Office Action from U.S. Appl. No. 10/569,318 mailed Aug. 15, 2008.
Office Action from U.S. Appl. No. 10/569,318 mailed Feb. 13, 2009.
Office Action from U.S. Appl. No. 10/569,318 mailed Jul. 31, 2009.
Office Action from U.S. Appl. No. 10/572,820 mailed Jun. 1, 2009.
Office Action from U.S. Appl. No. 10/571,148 mailed Apr. 15, 2009.
Office Action from U.S. Appl. No. 10/575,676 mailed Dec. 15, 2008.
Office Action from U.S. Appl. No. 10/575,676 mailed Mar. 13, 2009.
Office Action from U.S. Appl. No. 11/246,848 mailed Jun. 26, 2009.
Office Action from U.S. Appl. No. 11/252,177 mailed May 29, 2008.
Office Action from U.S. Appl. No. 11/252,177 mailed Nov. 5, 2008.
Office Action from U.S. Appl. No. 11/252,177 mailed Apr. 17, 2009.
Office Action from U.S. Appl. No. 11/252,177 mailed Sep. 18, 2009.

Gomila et al, "SEI Message for Film Grain Encoding" JVT of ISO/IEC MPEG & ITU-T VCEG, Document JVT-H0-22, $8^{th}$ Meeting: Geneva, CH, May 23-27, 2003.

Conklin et al: "Dithering 5-Tap Filter for Inloop Deblocking", JVT of ISO/IEC MPEG & ITU-T VCEG, $3^{rd}$ Meeting, Fairfax, A, May 6-10, 2002.

Schlockerman et al: "Film Grain Encoding in H.264/AVC," JVT of ISO/IEC MPEG & ITU-T VCEG, Document JVT-1034d2, $9^{th}$ Meeting, Sep. 2-5, 2003 San Diego, CA.

Christine Gomila, "SEI message for film grain encoding: syntax and results," Joint Video Team of ISO/IEC MPEG & ITU-T VCEG, 7th Meeting: San Diego, CA, Sep. 2-5, 2003.

* cited by examiner

LOW-COMPLEXITY FILM GRAIN SIMULATION TECHNIQUE

CROSS-REFERENCE TO RELATED APPLICATIONS

This application claims the benefit, under 35 U.S.C. §365 of International Application PCT/US2005/034723, filed Sep. 26, 2005, which was published in accordance with PCT Article 21(2) on Jun. 1, 2006 in English and which claims the benefit of U.S. provisional patent application No. 60/630,640, filed Nov. 23, 2004.

TECHNICAL FIELD

This invention relates to a technique for simulating film grain in an image.

BACKGROUND OF THE INVENTION

Motion picture films comprise silver-halide crystals dispersed in an emulsion, which is coated in thin layers on a film base. The exposure and development of these crystals form the photographic image consisting of discrete tiny particles of silver. In color negatives, the silver undergoes chemical removal after development and tiny blobs of dye occur on the sites where the silver crystals form. These small specks of dye are commonly called 'grain' in color film. Grain appears randomly distributed on the resulting image because of the random formation of silver crystals on the original emulsion. Within a uniformly exposed area, some crystals develop after exposure while others do not.

Grain varies in size and shape. The faster the film, the larger the clumps of silver formed and blobs of dye generated, and the more they tend to group together in random patterns. The grain pattern is typically known as 'granularity'. The naked eye cannot distinguish individual grains, which vary from 0.0002 mm to about 0.002 mm. Instead, the eye resolves groups of grains, referred to as blobs. A viewer identifies these groups of blobs as film grain. As the image resolution becomes larger, the perception of the film grain becomes higher. Film grain becomes clearly noticeable on cinema and high-definition images, whereas film grain progressively loses importance in SDTV and becomes imperceptible in smaller formats.

Motion picture film typically contains image-dependent noise resulting either from the physical process of exposure and development of the photographic film or from the subsequent editing of the images. The photographic film possesses a characteristic quasi-random pattern, or texture, resulting from physical granularity of the photographic emulsion. Alternatively, a similar pattern can be simulated over computed-generated images in order to blend them with photographic film. In both cases, this image-dependent noise is referred to as grain. Quite often, moderate grain texture presents a desirable feature in motion pictures. In some instances, the film grain provides visual cues that facilitate the correct perception of two-dimensional pictures. Film grain is often varied within a single film to provide various clues as to time reference, point of view, etc. Many other technical and artistic uses exist for controlling grain texture in the motion picture industry. Therefore, preserving the grainy appearance of images throughout image processing and delivery chain has become a requirement in the motion picture industry.

Several commercially available products have the capability of simulating film grain, often for blending a computer-generated object into a natural scene. Cineon® from Eastman Kodak Co, Rochester N.Y., one of the first digital film applications to implement grain simulation, produces very realistic results for many grain types. However, the Cineon® application does not yield good performance for many high speed films because of the noticeable diagonal stripes the application produces for high grain size settings. Further, the Cineon® application fails to simulate grain with adequate fidelity when images are subject to previous processing, for example, such as when the images are copied or digitally processed.

Another commercial product that simulates film grain is Grain Surgery™ from Visual Infinity Inc., which is used as a plug-in of Adobe® After Effects®. The Grain Surgery™ product appears to generate synthetic grain by filtering a set of random numbers. This approach suffers from disadvantage of a high computational complexity.

None of these past schemes solves the problem of restoring film grain in compressed video. Film grain constitutes a high frequency quasi-random phenomenon that typically cannot undergo compression using conventional spatial and temporal methods that take advantage of redundancies in the video sequences. Attempts to process film-originated images using MPEG-2 or ITU-T/ISO H.264 compression techniques usually result in either an unacceptably low degree of compression or complete loss of the grain texture.

Thus, there exists a need for a technique simulating film grain, especially a technique that affords relatively low complexity.

BRIEF SUMMARY OF THE INVENTION

Briefly, there is provided a method in accordance with the present principles for simulating film grain. The method commences by creating a block (i.e., a matrix array) of transformed coefficients responsive to a band pass region associated with a desired grain pattern. (The band pass region is defined by a set of cut frequencies $f_{HL}$, $f_{VL}$, $f_{HH}$, and $f_{VH}$ that represent cut-off frequencies (in two dimensions) of a filter that characterizes the desired film grain pattern). The block of transformed coefficients undergoes an inverse transform to yield a bit-accurate film grain sample. If desired, the bit accurate sample can undergo scaling to enable blending with a video signal to simulate film grain in the signal.

In practice, generation of the block of transformed coefficients occurs as follows. For each coefficient at coordinates (xy) in the block, where x and y are integers designating the row and column, respectively, a random value (r) is obtained, if each of the x and y coordinates lies within the band pass of the cut frequencies $f_{HL}$ and $f_{HH}$ and $f_{VL}$ and $f_{VH}$, respectively. The value of the coefficient at the coordinates (x,y) becomes the random value r. The process is repeated for every entry in the block.

The film grain simulation technique of the present principles affords reduced complexity as compared to prior-art transform-based approaches for film grain simulation by avoiding the computation of a direct transform. The technique also reduces the memory requirements of database-based approaches by storing a small set of transformed coefficients instead of film grain patterns. The present method has applicability to HD DVD systems, BD ROM systems as well as to satellite broadcasting, among other uses.

DETAILED DESCRIPTION OF THE DRAWINGS

DETAILED DESCRIPTION

Figure 1:
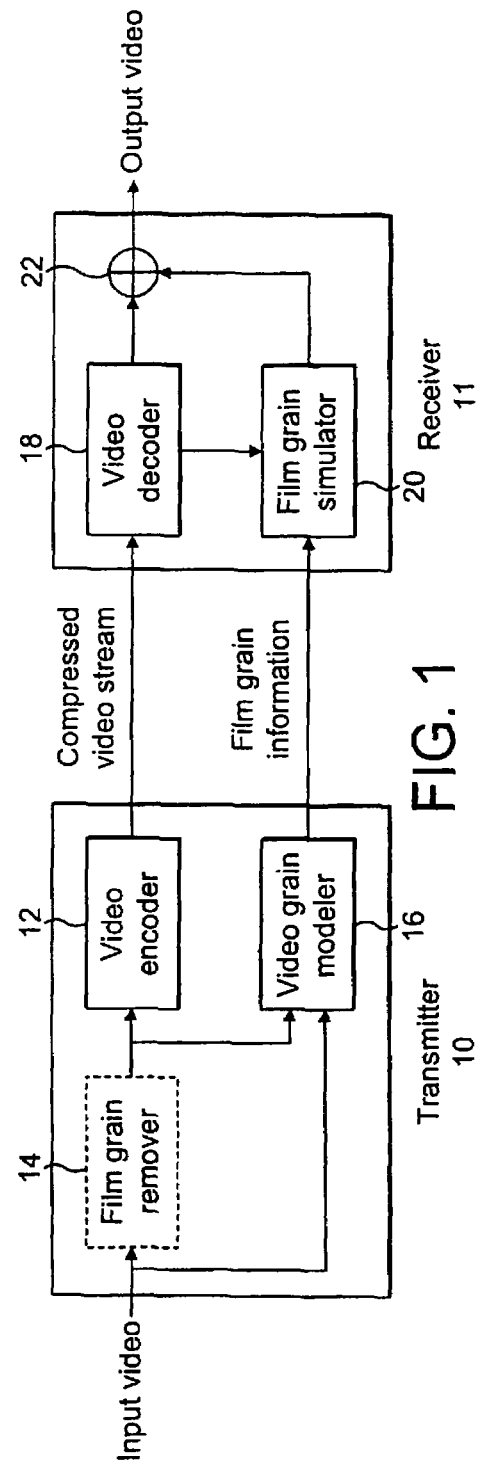
FIG. 1 depicts a block schematic diagram of the combination of a transmitter and receiver in a film Grain Processing chain useful for practicing the technique of the present principles.

To best understand the technique of the present principles for simulating film grain using a set of cut frequencies that characterize the film grain pattern, a brief overview of film grain simulation will prove helpful. FIG. 1 depicts a block schematic diagram of a transmitter 10, which receives an input video signal and, in turn, generates a compressed video stream at its output. In addition, the transmitter 10 also generates information indicative of the film grain (if any) present in the sample. In practice, the transmitter 10 could comprises part of a head-end array of a cable television system, or other such system that distributes compressed video to one or more downstream receivers 11, only one of which is shown in FIG. 1. The transmitter 10 could also take the form of encoder that presents media like DVDs. The receiver 11 decodes the coded video stream and simulates film grain in accordance with the film grain information and decoded video, both received from the transmitter 10 or directly from the media itself in the case of a DVD or the like, to yield an output video stream that has simulated film grain. The receiver 11 can take the form of a set-top box or other such mechanism that serves to decode compressed video and simulate film grain in that video.

The overall management of film grain requires the transmitter 10 (i.e., the encoder) provide information with respect to the film grain in the incoming video. In other words, the transmitter 10 "models" the film grain. Further the receiver 11 (i.e., decoder) simulates the film grain according to the film grain information received from the transmitter 10. The transmitter 10 enhances the quality of the compressed video by enabling the receiver 11 to simulate film grain in the video signal when difficulty exists in retaining the film grain during the video coding process.

In the illustrated embodiment of FIG. 1, the transmitter 10 includes a video encoder 12 which encodes the video stream using any of the well known video compression techniques such as the ITU-T Rec. H.264|ISO/EEC 14496-10 video compression standard. Optionally, a film grain remover 14, in the form of a filter or the like depicted in dashed lines in FIG. 1, could exist upstream of the encoder 12 to remove any film grain in the incoming video stream prior to encoding. To the extent that the incoming video contains no film grain, no need would exist for the film grain remover 14.

A film grain modeler 16 accepts the input video stream, as well as the output signal of the film grain remover 14 (when present). Using such input information, the film grain modeler 16 establishes the film grain in the incoming video signal. In its simplest form, the film grain modeler 16 could comprise a look up table containing film grain models for different film stocks. Information in the incoming video signal would specify the particular film stock used to originally record the image prior to conversion into a video signal, thus allowing the film grain modeler 16 to select the appropriate film grain model for such film stock. Alternatively, the film grain modeler 16 could comprise a processor or dedicated logic circuit that would execute one or more algorithms to sample the incoming video and determine the film grain pattern that is present.

The receiver 11 typically includes a video decoder 18 that serves to decode the compressed video stream received from the transmitter 10. The structure of the decoder 18 will depend on the type of compression performed by the encoder 12 within the transmitter 10. Thus, for example, the use within the transmitter 10 of an encoder 12 that employs the ITU-T Rec. H.264|ISO/EEC 14496-10 video compression standard to compress outgoing video will dictate the need for an H.264-compliant decoder 18. Within the receiver 11, a film grain simulator 20 receives the film grain information from the film grain model 16. The film grain simulator 20 can take the form of a programmed processor, or dedicated logic circuit having the capability of simulating film grain for combination via a combiner 22 with the decoded video stream.

Film grain simulation aims to synthesize film grain samples that simulate the look of the original film content. As described, film grain modeling occurs at the transmitter 10 of FIG. 1, whereas film grain simulation occurs at the receiver 11. In particular, film grain simulation occurs in the receiver 11 along with the decoding the incoming video stream from the transmitter 10 but upstream of the output of the decoded video stream. Note that the decoding process that occurs in the receiver 11 makes no use of images with added film grain. Rather, film grain simulation constitutes a post-processing method for synthesizing simulated film grain in the decoded images for display. For that reason, the ITU-T Rec. H.264|ISO/EEC 14496-10 video compression standard contains no specifications regarding the film grain simulation process. However, film grain simulation requires information concerning the grain pattern in the incoming video signal, which information typically undergoes transmission in a Supplemental Enhancement Information (SEI) message when using the ITU-T Rec. H.264|ISO/IEC 14496-10 video compression standard as specified by the Amendment 1 (Fidelity Range Extensions) of that compression standard.

In accordance with the present principles, there is provided a low-complexity method for simulating film grain, which presupposes that the transformation used to simulate film grain is linear. The method of the present principles, which is practiced by the film grain simulator 20 of FIG. 1, generates a block of film grain in a process that includes the following three steps: (1) create a block of transformed coefficients in accordance with the cut-frequencies for a desired film grain pattern, (b) compute an inverse transform and (c) scale the resultant values. A more complete description of each process follows hereinafter.

Creating a Block of Transformed Coefficients

The process of creating of a block of transformed coefficients takes as its input a set of cut frequencies characterizing a desired film grain pattern and yields a set of normalized random numbers. In a preferred embodiment, the normalized random numbers will follow a normalized Gaussian random distribution (independent and identically distributed Gaussian random variable samples with zero mean and unity variance) while the cut frequencies are transmitted in a film grain characteristics SEI message, as defined by the ITU-T Rec. H.264|ISO/EEC 14496-10 standard [1].

Figure 2:
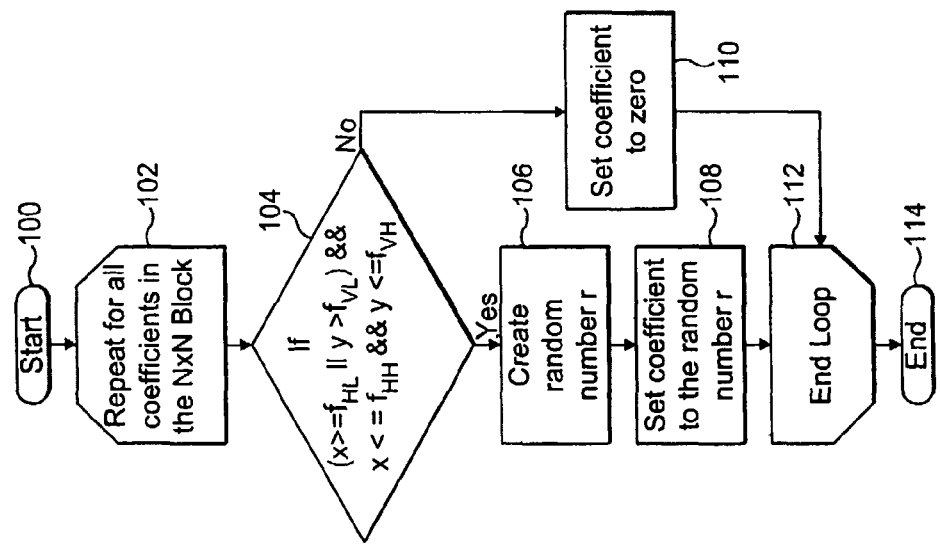
FIG. 2 depicts, in flow chart form, the steps of a first method for creating a set of transformed coefficients for simulating film grain in accordance with the present principles.

In the illustrated embodiment, the creation of a block image B (e.g., a block of transformed coefficients of size N×N) in the frequency domain occurs in the manner illustrated in flow chart form in FIG. 2. The process begins at Start step 100 during which initialization occurs. Following step 100, step 102 occurs, commencing a loop which scans all coefficients of the N×N block by setting a pair of running variables (x,y) to all possible values in the integer range of [0,N−1]×[0,N−1]. The variables x and y each represent the x and y coordinates, respectively, of an entry in a block (i.e., a matrix array) of transformed coefficients produced by this process. During step 104, a check occurs whether the values of x and y lie within the band pass defined by the cut frequencies $f_{HL}$ and $f_{HH}$ and $f_{VL}$ and $f_{VH}$. If so, step 106 occurs and a random number is generated and during step 108 the random number is assigned to the coefficient in the block at the x and y coordinates matching the current value of the running variables x and y, respectively. Step 104 illustrates a preferred embodiment of the checking of x and y values to decide whether or not they lie within the band pass defined by the cut frequencies, but other criteria are possible.

If the current values of x and y do not lie simultaneously within the band pass defined by the cut frequencies $f_{HL}$ and $f_{HH}$ and $f_{VL}$ and $f_{VH}$ of the desired film grain pattern, as transmitted in the SEI message, then the coefficient in the block associated with the current value of x and y is set to zero during step 110. Following either of steps 108 or 110, then step 112 occurs, and the running variables x and y are incremented, provided that x and y≦N and execution branches to step 104. Otherwise, the loop ends during step 112 and the method finishes at End step 114.

The method for creating a block of transformed coefficients depicted in FIG. 2 can be described in a "for" computer program loop in the following manner:

```
for( y = 0; y < N; y++ )
    for( x = 0; x < N; x++)
        if( ( x < f_HL && y < f_VL) || x > f_HH || y > f_VH )
            B[ x ][ y ] = 0
        else
            B[ x ][ y ] = r
B[ 0 ][ 0 ] = 0
```

Note that $f_{HL}$ and $f_{VL}$ constitute the horizontal and vertical low cut frequencies, respectively; $f_{HH}$ and $f_{VH}$ constitute the horizontal and vertical high cut frequencies, respectively of the desired film grain pattern, and r constitutes a normalized random number. In practice, a Gaussian random number r could be generated from two independent, uniformly distributed random values, using the Box-Muller transformation specified by:

$$r = \sqrt{\sqrt{-2\ln(x_1)} \cdot \sin(2\pi x_2)}$$

where ln(.) is the natural logarithm, sin(.) is the sine function, π is Archimedes's constant, and $x_1$ and $x_2$ are in the range of (0,1), with 0 not included.

Figure 3:
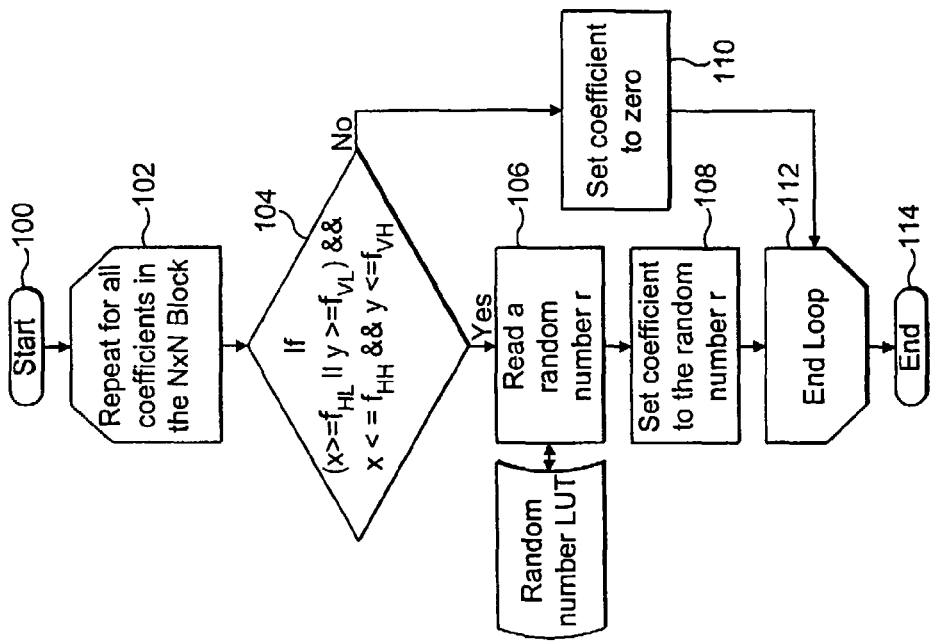
FIG. 3 depicts, in flow chart form, the steps of a second method for creating a set of transformed coefficients for simulating film grain in accordance with the present principles.

FIG. 3 depicts an alternate preferred method for creating a block of transformed coefficients. The flow chart method of FIG. 3 includes almost all of the same steps as the method of FIG. 2 and therefore like reference numbers appear in FIG. 3 as in FIG. 2 to describe like steps. The method of FIG. 3 differs in the following respect. Instead of obtaining a random number during step 106 in FIG. 2 through mathematical computation, the method of creating a block of transformed coefficients of FIG. 3 includes the step 105 of obtaining a random number from a look-up table 110 of previously computed Gaussian random numbers. Otherwise, the two methods practice the same steps.

Optionally, the block transformed coefficient generation methods of FIGS. 2 and 3 could force the coefficient at the position 0,0 (i.e., the DC coefficient) to become zero in order to ensure that after inverse transform, the signal will have zero mean. Large deviations from zero for the DC coefficient could cause large deviations in the average value of the resulting film grain block. As a consequence, when blending the film grain with the decoded image, blocks could show visible variations in their average value (i.e., the blocks could become either darker or brighter).

In the case when $f_{HL}$ and $f_{VL}$ both equal to zero, the creation of the block image B in the frequency domain can occur as follows:

```
for(y = 0; y < N; y++ )
    for( x = 0; x < N; x++)
        if( x > f_HH || y > f_VH )
            B[ x ][ y ] = 0
        else
            B[ x ][ y ] = r
B[ 0 ][ 0 ] = 0
```

Assuming also the ability to accomplish zero value initialization upon memory allocation of the block image, the previous method can be simplified to the following expression:

```
for( y = 0; y < N; y++ )
    for( x = 0; x < N; x++)
        if( x <= f_HH && y <= f_VH )
            B[ x ][ y ] = r
```

Note that the processes described in FIGS. 2 and 3 make use of $(f_{HH}-f_{HL}+1)*(f_{VH}-f_{VL}+1)$ normalized random values, thereby avoiding the filtering step that typically follows the computation of the forward transform of a block of normalized random numbers.

Compute the Inverse Transform

Following generation of the block of transformed coefficients, computation of the inverse transform occurs, typically according to the general formula:

$$b = a \cdot (C^T \times B \times C)$$

where a constitutes a scaling factor that compensates for intensity variation resulting from the generation of the block of transformed coefficients. Typically, the scaling factor a can have a value of unity.

When using a DCT transform, computation of the transformation matrix C occurs as follows:

$$C = \begin{pmatrix} c_{0,0} & \cdots & c_{0,N-1} \\ \vdots & \ddots & \\ c_{N-1,0} & & c_{N-1,N-1} \end{pmatrix}$$

$$c_{m,n} = k \cos\left(\frac{(2n+1)m\pi}{2N}\right)$$

$$k = \begin{cases} \sqrt{1/N} & \text{if } m = 0 \\ \sqrt{2/N} & \text{otherwise} \end{cases}$$

in this case, $$a = \frac{1}{\|C\| \cdot \|C^T\|}.$$

Scaling of the Inverse Transform Resultant Values

Following the creation of the block of transformed coefficients and computation of the inverse transform of the block, the film grain simulation process of the present principles typically includes the step of scaling the film grain pattern to the appropriate film grain intensity, although such scaling not necessarily occur. For video coding applications, information about the film grain intensity typically undergoes transmission in the SEI message, as specified in the ITU-T Rec. H.264|ISO/IEC 14496-10 standard.

The scaling process typically occurs in accordance in the following manner:

```
for(y = 0; y < N; y++ )
    for( x = 0; x < N; x++)
        b[ x ][ y ] *= scaling_factor
```

This approach presents a tradeoff between complexity and memory requirements when compared to prior art methods. On one hand, the scaling method of the present principles reduces the complexity of transform-based approaches by avoiding computation of the direct transform and filtering in the frequency domain. On the other hand, the scaling method of the present principles reduces the memory requirements of database-based approaches by only storing a small set of transformed coefficients instead of complete film grain patterns.

Figure 4:
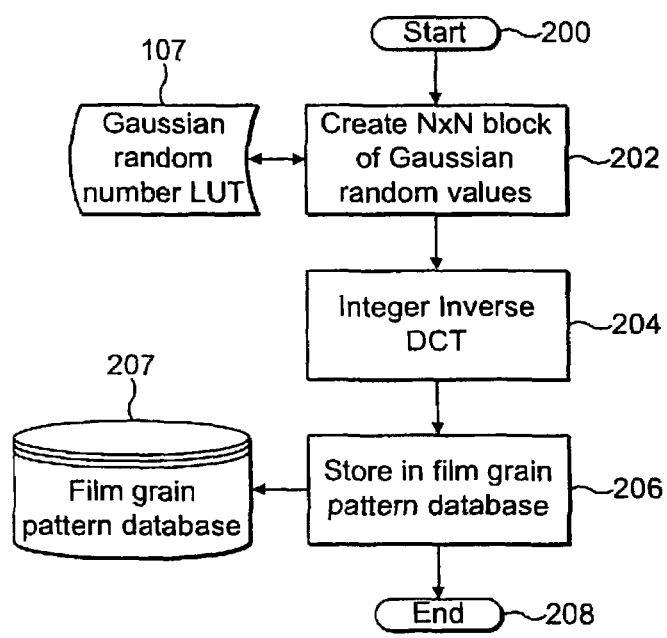
FIG. 4 depicts, in flow chart form, the steps of a method for creating a database of film grain patterns in accordance with the present principles.

The method of the present principles can serve to initialize a database of film grain patterns. In particular, the steps of creating a the block of transformed coefficients and computing the inverse transform of the block could serve to initialize a database of film grain patterns as illustrated in flow chart form in FIG. 4. The method of FIG. 4 commences upon execution of Start step 200 whereupon initialization occurs. Thereafter, step 202 occurs with generation of the block of Gaussian random values, using either the method of FIG. 2, or the method of FIG. 3. When employing the block transform generation method of FIG. 3, each random number entry is obtained by accessing the Gaussian random number look-up table 107, as discussed previously. Following step 202, the block of Gaussian random values undergoes an inverse transform, typically via an Inverse Discrete Cosine Transform (IDCT) during step 204, along with the appropriate scaling. During step 206, the film grain patterns undergo storage in a database 207. Thereafter, the process ends at step 208. The process of FIG. 4 allows creation of the database 207 upon system initialization or reset, and enables storage in a conventional memory (usually SRAM memory).

The foregoing describes a technique for simulating film grain in an image that affords the advantage of low complexity.

The invention claimed is:

1. A method executed by a video signal receiving device for simulating film grain, comprising the steps of:
    creating, at the video signal receiving device, coefficients responsive to a band pass region associated with a desired film grain pattern, each coefficient having a value at coordinates (x, y) which is a random value for so long as x and y lie in a band pass region defined by the cut frequencies $f_{HL}$, $f_{VL}$, $f_{HH}$ and $f_{VH}$, which represent cut frequencies (in two dimensions) of a filter that characterizes the desired film grain pattern, but are zero otherwise; and
    establishing, at the video signal receiving device, an inverse transformation of the created coefficients to yield a film grain sample for blending in a video image.

2. The method according to claim 1 further comprising the step of setting the coefficient at (0,0) to a zero value.

3. The method according to claim 1 wherein each of the random values obtained for so long as x and y lie in the band pass defined by a set of cut frequencies $f_{HL}$, $f_{VL}$, $f_{HH}$ and $f_{VH}$ follows a Gaussian random distribution.

4. The method according to claim 1 wherein each of the random values is obtained by accessing an entry from a pre-computed look-up table of random values.

5. The method according to claim 1 further including the step of scaling the film grain sample.

6. A method executed by a video signal receiving device for creating coefficients used to simulate a desired film grain pattern, comprising the steps of:
    (a) obtaining, at the video signal receiving device, a value for each coefficient at coordinates (x, y) which is a random value for so long as x and y lie in a band pass region defined by the cut frequencies $f_{HL}$, $f_{VL}$, $f_{HH}$ and $f_{VH}$, which represent cut frequencies (in two dimensions) of a filter that characterizes the desired film grain pattern, but are zero otherwise;
    (b) setting, at the video signal receiving device, the value of the coefficient at coordinates (x, y) to the obtained value; and
    (c) repeating steps (a) and (b) until a value is set for every coefficient in the block.

7. The method according to claim 6 further comprising the step of setting coefficient at (0,0) to a zero value.

8. The method according to claim 6 wherein each of the random values is obtained by accessing an entry from a pre-computed look-up table of random values.

9. The method according to claim 6 further including the step of establishing an inverse transform on the coefficients.

10. The method according to claim 9 further including the step of scaling the inverse transform of the coefficients to yield a pattern of film grain samples.

11. The method according to claim 10 further comprising the step of initializing a database of film grain patterns using a single block of coefficients to create all possible film grain patterns.

12. The method according to claim 10 further comprising the step of initializing a database of film grain patterns using multiple blocks of coefficients to create all possible film grain patterns.

13. Apparatus for simulating film grain, comprising one of a programmed processor and logic circuit for (1) creating coefficients responsive to a band pass region associated with a desired film grain pattern, each coefficient having a value at coordinates (x, y) which is a random value for so long as x and y lie in a band pass region defined by the cut frequencies $f_{HL}$, $f_{VL}$, $f_{HH}$, and $f_{VH}$, which represent cut frequencies (in two dimensions) of a filter that characterizes the desired film grain pattern, but are zero otherwise, 2) establishing an inverse transformation for the created coefficients; and (3) scaling the inversely transformed coefficients to create a simulated pattern of film grain for blending in a video image.

14. The apparatus according to claim 13 wherein the one of the programmed processor or logic circuit creates the coefficients by setting the block coefficient at (0,0)to a zero value.

15. The apparatus according to claim 13 wherein the one of the programmed processor or logic circuit obtains each of the random values by accessing an entry from a pre-computed look-up table of random values.

16. Apparatus for simulating film grain, comprising:
    means for creating coefficients responsive to a band pass region associated with a desired film grain pattern, each coefficient having a value at coordinates (x, y) which is a random value for so long as x and y lie in a band pass region defined by the cut frequencies $f_{HL}$, $f_{VL}$, $f_{HH}$ and $f_{VH}$, which represent cut frequencies (in two dimensions) of a filter that characterizes the desired film grain pattern, but are zero otherwise;

means for establishing an inverse transformation for the created coefficients; and means for scaling the inversely transformed coefficients to create a simulated pattern of film grain for blending in a video image.

\* \* \* \* \*